United States Patent Office 3,541,179
Patented Nov. 17, 1970

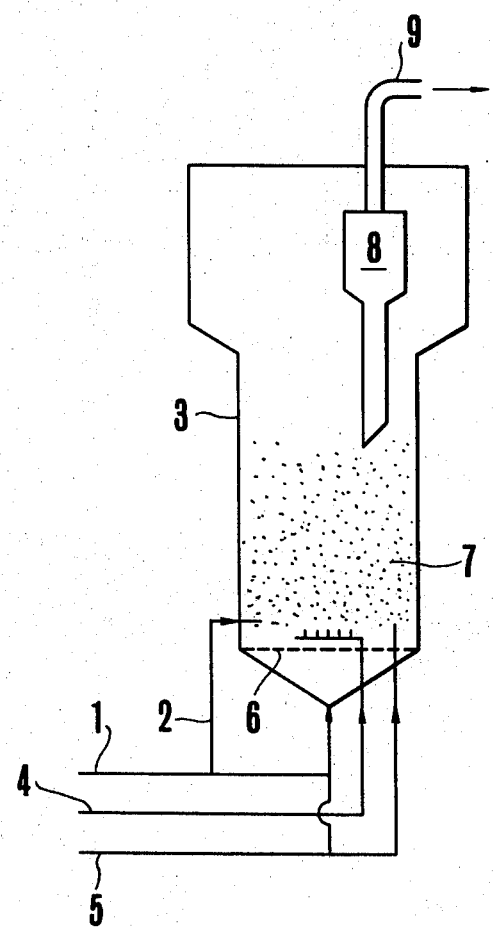

3,541,179
PROCESS FOR MANUFACTURING OLEFINS
BY CATALYTIC PARTIAL OXIDATION OF
HYDROCARBONS
Akio Okagami and Seiichi Matsuoka, Tokyo, Japan, assignors to Japan Gasoline Co., Ltd., Tokyo, Japan, a corporation of Japan
Filed Nov. 1, 1967, Ser. No. 679,863
Claims priority, application Japan, Nov. 10, 1966, 41/73,503
Int. Cl. C07c 5/18, 5/22; C07g 11/04
U.S. Cl. 260—683.3                                    12 Claims

ABSTRACT OF THE DISCLOSURE

Mono-olefins, predominantly ethylene, are manufactured by the catalytic cracking of hydrocarbons at a temperature of 650° to 900° C., with an oxygen-containing gas, with the amount of oxygen being in the range of 0.03 to 1.1 parts by weight based on the weight of the hydrocarbon, in the presence of a fluidized bed of a catalyst composition consisting of at least 80 percent by weight of inert fire resistant particles of a particle size $20\mu$ to 5 mm., on which is deposited from 0.5 to 20 percent by weight, calculated as the metal, of at least one catalyst component selected from the group consisting of copper, manganese, and vanadium.

BACKGROUND OF THE INVENTION

Field of the invention

The present invention is concerned with a process for manufacturing ethylene and other lower olefins by a reaction which is not accompanied by the formation of by-products of carbonaceous substances. The process involves subjecting hydrocarbons to a reaction with an oxygen-containing gas in a fluidized catalyst bed. More particularly, the present invention relates to an improved partial oxidation process or partial combustion process which eliminates the various shortcomings encountered in the conventional partial oxidation processes or partial combustion processes, due to the adoption of a fluidized catalyst bed in said process of manufacturing olefins by means of catalytic partial oxidation or catalytic partial combustion of hydrocarbons.

Description of the prior art

In order to obtain lower olefins, especially ethylene, from the cracking of hydrocarbons, it is necessary to raise the temperature of the charged hydrocarbons to 650° C. or higher and to add heat for maintaining the required reaction temperature in an amount corresponding to the heat absorbed mainly as the result of the formation of olefins. As the heating means to be used in such operations, it is known to use an indirect heating system employing an apparatus, such as a tubular heating furnace, an internal heating system including processes using a regenerative heat accumulating furnace and a furnace employing a heating medium of the movable bed type and a partial oxidation process utilizing an oxygen-containing gas, an oxidation process utilizing a solid oxidizing agent and direct heating utilizing a flame or a high temperature flue gas.

In general, the internal heating system permits one to obtain a high temperature with relative ease, and the partial oxidation system is especially featured by the advantage that neither the materials constituting the furnace, nor the heating medium used, need to be heated above the necessary reaction temperature. In the partial oxidation system designed particularly for the manufacture of olefins, on the other hand, the cost of the materials to be charged tends to increase as compared with the cost of the same in the external heating system, owing to the fact that this former system uses oxygen. Moreover, in conventional partial oxidation processes, there have been formed as by-products large amounts of carbon monoxide and hydrogen as a result of the endothermic reaction between oxygen and the charged hydrocarbons. Therefore, the amount of oxygen consumption inevitably becomes much greater than is experienced in the oxidizing reaction of the most desirable pattern for the partial oxidation system directed to the manufacture of olefins. The latter desirable oxidizing reaction being such that it produces carbon dioxide and water as byproducts as a result of the reaction and same is accompanied by the generation of a maximum amount of heat. As a result, said conventional partial oxidation system led to a still further increase in the cost of the charged stocks and, moreover, had the shortcoming that the produced olefins were diluted with non-condensable light gases, resulting in the imposition of an increased burden on the refining process.

A comparative analysis will hereunder be made in a quantitative manner with respect to the shortcomings of these conventional partial oxidation systems in connection with their reaction patterns and with respect also to the desired type of reactions in the partial oxidation, by referring to the formation of olefins.

TABLE 1

| Reaction | Heat of reaction Kcal./mole $C_3H_8$ (at 1000° K.) |
|---|---|
| (a) $C_3H_8 \rightarrow C_2H_4CH_4$ | Absorbed heat 13.68 |
| (b) $C_3H_8+0.61O_2 \rightarrow C_2H_4+CO+0.78H_2+0.22H_2O$ | 0 |
| (c) $C_3H_8+0.26O_2 \rightarrow C_2H_4+0.74CH_4+0.26CO_2 +0.26H_2$ | 0 |
| (d) $C_3H_8+0.29O_2 \rightarrow C_2H_4+0.71CH_4+0.29CO +0.29H_2O$ | 0 |
| (e) $C_3H_8+0.21O_2 \rightarrow C_2H_4+0.86CH_4+0.14CO_2 +0.14H_2O$ | 0 |
| (f) $C_3H_8+0.20O_2 \rightarrow 0.4C_3H_6+0.6C_2H_4+0.6CH_4 +0.4H_2O$ | 0 |

The reaction formula indicated by (a) in Table 1 represents a thermal cracking reaction of propane which is shown as the reference. The reaction (b) represents a typical example of the conventional partial oxidation systems. It will be noted that as large an amount as 0.61 mole of oxygen is required per mole of propane. The requirement for such a large amount of oxygen is due to the fact that, whereas the reaction leading to the production in $H_2$ and CO or, in other words, the reaction which is expressed by $C_3H_8+0.5O_2 \rightarrow C_2H_4+CO+H_2$, represents an oxidation reaction, this reaction is accompanied by a heat absorption of 13.34 Kcal./mole at 1000° K. Thus, it is necessary to further supply 0.11 mole of oxygen to thereby oxidize a part of hydrogen so as to generate heat to compensate for the shortage of the required heat. Reactions (c) through (f) each generates a large amount of heat per unit amount of oxides produced so that it is possible to supply, with a very small amount of oxygen such as 0.2–0.3 mole per mole of propane, the heat required for the satisfactory formation of the ethylene and the methane which are obtained in the reaction (a). These reactions (c) through (f) can, therefore, be considered as being suitable for the manufacture of olefins. When the reactions (c) through (f) are analysed in further detail, it will be noted that the oxygen consumption per unit amount of production of ethylene is the least with the reaction (e). In short, such a partial oxidation, where the oxides of carbon are limited to only CO or where there is hardly any production of water, represents, as far as the reaction is intended for the production of lower olefins, an undesirable reaction because oxygen contributes the least to the internal heating. On the contrary, the partial oxidation which is accompanied by practically no production of carbon monoxide, but rather is accompanied by the selective formation of carbon dioxide and water, represents an internal heating system of the most desirable type for said purpose.

When Table 1 is analysed from the aspect of the dilution of the olefins with gaseous by-products, it will be noted that the reactions (b) through (d) give relatively large amounts of lighter gases, other than olefins, such as methane, carbon monoxide and hydrogen which are not condensed at all under the conditions used in the separation and refining of ethylene which is performed by distillation at low temperatures and under pressure. Especially in the reaction (b) which represents the typical reaction in a conventional partial oxidation process, there is formed, as a by-product, a non-condensable gas in an amount as large as about twice that of the ethylene produced. In the reactions (e) and (f), contrariwise, the amount of the non-condensable gas does not even reach an amount equal to that of the ethylene obtained. A lowering of the amount of non-condensable gases permits a lessening of the burden which would otherwise be imposed on the refining process of olefins which burden is represented by the additional cost required for the compression and refrigeration apparatus and for the operation thereof. Therefore, a lowering of the amount of non-condensable gases is extremely advantageous for the partial oxidation processes.

As has been described in detail, reactions of the type similar to the partial oxidation reactions indicated in the reaction formulas (e) and (f) can be considered as being most desirous, as viewed also from the aspects of the effective internal heating ability of oxygen and viewed also from the composition of the by-product gases.

According to R. Halroyd, U.S. Bureau of Mines Inform. Circular 7370 (1964), the composition of gases produced in the conventional partial oxidation process according to the method of I. G. Farbenindustrie, A. G. Leuna Works, wherein 1 volume of oxygen was used for oxidizing 3 volumes of ethane is as shown in the following Table 2, from which it is noted that hydrogen and carbon monoxide were formed in large amounts. More specifically, oxygen did not contribute to the heat generation to a satisfactory degree.

TABLE 2.—AN EXAMPLE OF THE COMPOSITION OF GAS PRODUCED FROM PARTIAL OXIDATION (MOL PERCENT)

| | |
|---|---|
| $H_2$ | 27.0 |
| $N_2$ | 1.0 |
| $O_2$ | 0.6 |
| CO | 11.0 |
| $CO_2$ | 1.4 |
| $CH_4$ | 8.0 |
| $C_2H_6$ | 17.0 |
| $C_2H_4$ | 31.0 |
| $C_3H_6$ | 2.5 |
| $C_2H_2$ | 0.5 |

Rather, oxygen gave rise to the formation of light gases, as by-products, in excessive amounts, leading to an increase in the burden imposed on the subsequent refining process. This may be explained by the fact that the reaction of the formula (b) of Table 1 took place intensively, whereas the reaction of the formula (e) occurred to a lesser degree. It has been known very well, however, that hydrogen and carbon monoxide are formed in large amounts from partial oxidation which is conducted at a high temperature. What is more, this knowledge is effectively utilized and there has been established a reaction process which permits the production of useful gases, such as a synthetic gas composed of hydrogen and carbon monoxide, even when oxygen is fed in a large amount. Considering such facts, it would be quite difficult to expect, from the knowledge of these prior techniques, that there could be devised a process for obtaining products rich in olefins while permitting carbon dioxide and water to be formed selectively when there is used an extremely small amount of oxygen, below the amount required for complete combustion.

SUMMARY OF THE INVENTION

The present invention contemplates an improvement for overcoming the shortcomings encountered in such conventional partial oxidation systems as have been described above and also contemplates the provision of a special technique based on the partial oxidation system, said special technique being such that it is capable of producing carbon dioxide and water as oxides, in predominant amounts while suppressing the generation of hydrogen to an extreme extent to thereby enhance the effective utilization of oxygen and at the same time to minimize the undesirable dilution of olefins with the light gases produced, while on the other hand retaining the advantages peculiar to the internal heating system effected by the partial oxidation system.

More specifically, the process of the present invention is intended for the manufacture of olefin-containing gases (and useful liquid fuels) by charging hydrocarbons having boiling points higher than that of ethane and an oxygen-containing gas to a fluidized bed reactor in which is placed a catalytic composition containing at least one catalytic component selected from the group consisting of copper, manganese, chromium, vanadium, zinc, silver and cadmium, for reaction therebetween at a temperature not lower than 650° C. but not higher than 900° C., for a reaction time period ranging from 0.02 second to 5 seconds.

BRIEF DESCRIPTION OF THE DRAWING

The accompanying drawing illustrates an apparatus suitable in the practicing of the process of the present invention.

DESCRIPTION OF THE PREFERRED EMBODIMENTS

Many of the conventional partial oxidation processes are so designed as to carry out oxidation in a space called a combustion chamber or in fixed spaces where checkers are provided. In contrast to these prior techniques, the process of the present invention is designed so that partial oxidation is performed in a fluidized bed consisting of solid particles having a special catalytic action. The conventional oxidation processes such as is reported in Petroleum Refiner, 42, No. 7, 119 (1963), describes the use of a fluidized bed consisting of petroleum coke formed simultaneously with the production of olefins from a crude oil, or of an inert heat-resistant granular material such as sillimanite. However, the process described in said literature can be distinguished from the process of the present invention in that the former fails to positively accomplish a reaction in the pattern of the formula (e), moreover coke does not provide a permanent granule. On the other hand, an inert heat-resistant granular material does not possess such catalytic activity as is required by the present invention.

The process of the present invention can be distinguished from the pyrolytic cracking process utilizing moving solid particles as the heating medium in that this latter process requires that the solid particles must be preheated in a vessel other than reaction vessel prior to cracking in the reactor, in contrast to the former which basically does not require the inclusion of such a preheating step.

A description of the present invention will be made in further detail by referring to the accompanying drawing.

Hydrocarbons which are the starting materials and which are preheated with the heat received, by heat exchange, from the effluents delivered from the reaction vessel, or by any other appropriate means, are fed through a feeding line 1 or through the lines 1 and 2 in some cases, into a reaction vessel 3. An oxygen-containing gas which has been preheated in a manner similar to that described above in connection with the preheating of hydrocarbons, is fed through a line, into the reaction vessel. Steam is fed, when necessary, into the reaction vessel through a line 5. In the reaction vessel 3 there is provided a gas distributor 6. A bed consisting of solid particles 7 including granular catalysts is placed in the portion of the vessel above said distributor 6. This bed of solid particles functions in such a manner that it promotes the reaction while the particles are held in a fluidized state which, in turn, is effected by the gas ejected into this vessel. The products from the cracking procedure are separated from said solid particles by a cyclone 8, and the separated products are withdrawn outside the reaction system through a line 9. After being cooled, they are subjected to ordinary washing and recovering steps.

The catalyst which is used in the present invention is of a structure comprising a fire-resistant granular carrier consisting of 80% or more by weight of particles of a grain size from $20\mu$ to 5 mm., and from 0.5 to 20% by weight, calculated as the metal, of at least one catalyst component selected from the group consisting of copper, manganese, chromium, vanadium, zinc, silver, and cadmium, said catalyst component being deposited on said carrier. The carriers which can be used in the present invention include alumina, silica alumina, and other synthetic inorganic compounds formed of these metals and containing a small amount of alkali and/or alkaline earth metals, and further includes other naturally occurring clay minerals containing these substances. In some cases, the aforesaid catalytic composition diluted with fire-resistant particles may be used. Particles which are used in such dilution preferably are those which are composed principally of alumina or silica or a combination thereof containing 80% or more by weight of particles ranging in grain size from $20\mu$ to 5 mm., and the amount of such particles which may be contained in the reaction vessel preferably is not in excess of 10 times the amount of the catalyst contained therein.

The following description will be directed to an example of the procedure of preparing the aforesaid catalyst.

Particles of $\gamma$-alumina of 0.7–0.9 mm. in grain size and 0.4 in porosity are heat-treated at 1100° C. for 40 hours in the presence of steam. 1 volume of the resulting alumina particles is impregnated with a 3% calcium nitrate aqueous solution for 24 hours. After drying, the particles are calcined at 600° C. for 2 hours. After impregnating the resulting particles with a 10% copper nitrate aqueous solution, they are again calcined at 400° C. Then, they are impregnated again in said copper nitrate aqueous solution, followed by calcination at 800° C. in air for 2 hours. As a result a catalyst comprising 7.5% by weight of copper as metal and 1% by weight of calcium as calcium oxide is obtained.

The fluidized-bed reactor which is used in practicing the process of the present invention should not in any way restrict the present invention. Ordinary types of fluidized-bed reaction vessels, or more specifically, a non-moving-and-fluidizing bed reactor and a moving-and-fluidizing-bed reactor which is so designed that the terminal velocity of the particles is increased to an extent beyond the flow speed of the fluid, may also be used. Neither is the fluidizing gas which is passed through the reaction bed limited to only oxygen-containing gases. Rather gaseous substances such as hydrogen, methane, oxygen, naphtha vapor, steam, and kerosene vapor and the like can be equally used as the fluidizing gas for the particles constituting the reaction bed, as far as such substances are maintained in the gas state at the conditions under which they are introduced into the reaction vessel. Starting materials which contain a liquid at the time that they are fed into the reactor, are introduced into the reaction system in an atomized state or they are sprayed onto the fluidized granular catalysts.

The starting materials which are used in the process of the present invention consist of ethane and hydrocarbons having boiling points higher than that of ethane. Liquefied gases, naphtha, kerosene or mixtures thereof which are composed principally of hydrocarbons; heavy oils and crude oils which contain sulphur compounds and nitrogen compounds, can be used also. In case a fraction which contains a large portion of non-volatile material, such as heavy oil, is used as the starting material, the operation of the reaction will be facilitated by the use of steam, methane, or hydrogen as an auxiliary promoting gas for promoting the fluidization.

Oils containing a residual component and having a Conradson residual carbon in an amount exceeding 25% by weight will inevitably cause the undesirable accumulation of carbonaceous substances on the catalysts even when the process of the present invention is employed, so long as the aim of the operation is to manufacture lower olefins. As a means for eliminating this accumulation of carbonaceous substances, it is possible to employ a process designed so as to generate a large amount of oxides of carbon by the use of a large amount of oxygen and to recover the heat produced from the reaction. This process, however, leads to a great increase in the proportion of the cost of oxygen as viewed from the entire manufacturing cost of the olefins, and for this reason, this process is of a limited industrial value. Accordingly, where there occurs the formation and accumulation of carbonaceous substances to an excessive degree leading to a reduced catalytic activity of the catalyst used or to a deterioration of the fluidized state in the reaction zone, it has been the common practice to withdraw a part of the granular catalytic composition and transfer same to a regenerator to therein remove the carbon on the surface of the catalysts by burning with air and then to recycle the regenerated catalysts to the reactor. Since crude oils having a Conradson carbon content of 10% or more are very rare, in general, most of the crude oils can be processed according to the process of the present invention without including the special step of regenerating the catalysts intended for the removal of the carbonaceous substances. Also, a majority of the topped crudes from conventional topping units can be processed by the use of the process of the present invention.

Among the conditions of reaction which are employed according to the process of the present invention, the reaction temperature preferably is in the range of from 650° C. to 900° C. Below 650° C., the rate of the reaction to form the lower olefins will decrease and this will not provide an economical space-time yield. Above 900° C., on the other hand, there will take place a markedly intensive formation of acetylene, and such a highly elevated temperature provides a too-severe condition for the well-being olefins, so that at such a high temperature the olefins which have been produced will consecutively convert to higher hydrocarbons. Thus, the employment of such a high temperature above 900° C. will be harmful in conducting the manufacture of olefins on an economical basis. As for the reaction time, reactions lasting for a short period of time are desirous where the reactions are carried out at a high temperature, and a prolonged reaction time is desired in case the reaction is performed at a low temperature, as in the case of the ordinary manufacture of olefins. For the process of the present invention, however, a length of time of less than 0.02 second will lead to a difficulty in obtaining a practical conversion even under operation conditions where the rate of reaction is so high. On the other hand, a prolonged reaction will result a reduced yield of olefins even when the reaction is performed at a low speed and a decreased space-time yield. The preferred duration, therefore, is 5 seconds at the longest.

While the amount of oxygen to be charged varies depending on such features as the nature of the starting material, the reaction temperature, the preheating temperature of the starting material and the once-through conversion, it is to be noted that, according to the present invention, the amount of oxygen to be added is in the range of from 0.03 to 1.1 parts by weight, and preferably, it is in the range of from 0.08 to 0.8 part by weight, per part by weight of the hydrocarbons charged. The oxygen used in the reaction, however, does not need to be highly pure. Air can be used. The employment of air, however, is limited only to such instances in which the starting materials are preheated to a high temperature or in which the once-through conversion is low. In instances other than these two, the volume of gas used in the refining of the olefin gases will increase due to the dilution with the nitrogen contained in the air fed. Therefore, the use of air is not desirable in these latter instances. Consequently, it is preferable to use an oxygen gas containing 5 to 20% by volume or less of inert gases.

According to the process of the present invention, lower olefins can be obtained with a great deal of economy, by the use of such a simple apparatus as described above and also by a simple procedure not requiring the inclusion of the step of regenerating the catalyst used, even from heavy hydrocarbons which have been regarded as being unsuitable for use as the starting materials in the production of olefins performed according to the partial oxidation process unless carbonaceous substances are allowed to accumulate on the surfaces of the catalyst used or unless the step of regenerating the particles of the heating medium is included in the process. The fact that the process of the present invention can use starting materials of a wide range of types represents the greatest advantage of the present invention which uses special catalytic compositions. The present invention includes a number of various other features which are industrially useful, in addition to the advantages described above.

For example, the compositions of the oxides which are formed from the reaction performed according to the process of the present invention differ from those of the oxides which are produced by the conventional partial oxidation processes. The oxides produced from the reaction according to the present invention are composed mainly of such compounds which are suitable for the manufacture of lower olefins such, for example, as ethylene. Attention is now directed to the atomic fraction of the fed oxygen which is converted to carbon monoxide. It will be noted that the fraction of oxygen converted to carbon monoxide by the adoption of the process of the present invention is 12% at the highest. Usually, it is in the order ranging from 2 to 10%. In contrast to this, the partial oxidation of 3 volumes of ethane with 1 volume of oxygen which was conducted according to the aforesaid I. G. Farbenindustries shows the fraction as high as 27%. Also, in the treatment of a crude oil performed at 720° C. by utilizing particles of petroleum coke produced from the process to form a fluidized bed therewith, which is reported in the aforesaid Petroleum Refiner 42, No. 7, 119 (1963), the fraction of oxygen converted to carbon monoxide is 14%. From these data of the prior art, it is noted that the carbon monoxide content of the products produced from the reaction which is carried out according to the process of the present invention is extremely small. This fact indicates that oxygen is converted mostly to water and carbon dioxide which generates a very high heat of combustion and that the conversion of oxygen to carbon monoxide which produces a lower heat of combustion takes place only to a negligible degree. In other words, said fact indicates the high selectivity which is possessed by the catalyst compositions of the present invention, said selectivity being such that it permits oxygen to be consumed only in a particular oxidation reaction which is highly useful for the internal heating. The selectivity of the oxidation reaction of the present invention brings forth not only the aforesaid thermal advantage, but also a great deal of profit in the step of separating lower olefins, such as ethylene, from other reaction products and also in the subsequent step of refining. More specifically, when the oxygen compound consists mainly of water and carbon dioxide, the water contained therein can be easily removed therefrom since it is of a nature to be readily liquefied by a mere procedure of cooling. Carbon dioxide, on the other hand, can also be easily separated by washing the compound with water first and then subjecting it to an absorption procedure which is effected by the use of a basic solution. Accordingly, it is quite easy to concentrate the produced olefins to a high degree. In contrast to this, the reaction products which are formed with the conventional partial oxidation processes, which give rise to a large amount of carbon monoxide and hydrogen formed as by-products, are such that even after the removal of water and carbon dioxide from the reaction products, the latter still contain a large amount of carbon monoxide and hydrogen which cannot be removed by such a easy procedure as washing with water and the subsequent simple absorption step. This residual carbon monoxide only serves to cause an unnecessary increase in the amount of the gas which is compressed and refrigerated in the subsequent step of separating olefins.

The normally liquid-form fractions which are formed as by-products in the reactions conducted by the process of the present invention contain various useful substances such, for example, as monocyclic aromatic hydrocarbons including benzene and toluene, plus heavy fractions having boiling points which are 200° C. or higher. These heavy fractions are valuable in that their sulphur content is very small. An example of the data taken on the treatment of a Middle East crude oil according to the process of the present invention shows that the sulphur content of this crude oil prior to the treatment is 2.8% by weight, whereas the fraction having boiling points of 200° C. or higher of the liquid product formed as a result of the treatment invariably shows a sulphur content which is as small as 0.3% by weight.

The following description will be directed to some of the examples of treatments conducted according to the process of the present invention. It is to be noted, however, that the scope of the present invention is not limited to these examples which are given simply to help with an understanding of the present invention.

*Example 1.*—At a level 400 mm. from the bottom of a quartz tube of 80 mm. in inner diameter and 1 m. in length was placed a perforated plate having perforations of 1 mm. in diameter and a ratio of opening area to the area of plate at 2%. A group of particles consisting of a mixture of 1 part by weight of an catalytic composition formed of granular carriers made of $\alpha$-alumina particles having grain sizes ranging from 0.14 mm. to 0.3 mm. and containing 10% by weight of metallic copper deposited thereon, and 1 part by weight of said carriers, was placed on said perforated plate to a static bed height of 80 mm. This group of particles was heated externally with an electric resistance wire to 800° C. Air was passed into said layer of particles from below said perforated plate at the rate of 2 Nm.³/hr. to form a fluidized bed. Thereafter, a small amount of ethane was admixed with the air current at a position below said perforated plate for being introduced int othe fluidized bed. Thereupon, oxidation took place, with the result that the temperature of the catalytic bed rose to the order of 900° C. In this stage, the heat applied from outside the vessel was reduced to maintain the temperature at 840° C. Then oxygen containing 5% by volume of nitrogen was fed into the vessel through a nozzle provided above said perforated plate at the rate of 1 Nm.³/hr., while at the same time increasing the flow rate of ethane to 2.5 Nm.³/hr., and suspending the supply of air to adjust the respective flow rates and the temperature. The amount of the dry gas produced was 3.37 Nm.³/hr. The composition of this gas is as shown in Table 3. The amount of the liquid produced was 960 cc./hr. which consisted mostly of water.

TABLE A.—COMPOSITION OF GAS PRODUCED (MOL PERCENT)

| | |
|---|---|
| $H_2$ | 23.3 |
| $N_2$ | 1.5 |
| $O_2$ | 0.0 |
| CO | 0.7 |
| $CO_2$ | 4.5 |
| $CH_4$ | 2.2 |
| $C_2H_4$ | 64.6 |
| $C_2H_6$ | 2.2 |
| $C_3H_6$ | 1.0 |
| $C_2H_2$ | 0.05 |

*Example 2.*—After calcining granular silica alumina carriers having grain sizes ranging from 0.3 mm. to 0.7 mm. and containing 13% by weight of alumina at 1200° C. for 20 hours, the particles of the carrier were impregnated with an aqueous solution of ammonium vanadate to deposit on the surfaces of said carriers 12% by weight of vanadium oxide in the form of $V_2O_5$. Then 5% by weight of copper oxide as metallic copper was deposited on the resulting carriers by impregnation with a copper nitrate aqueous solution to thereby prepare a catalytic composition. This composition was placed to a static bed height of 80 mm. in the same vessel as the one used in Example 1, and the operation was started in the same manner as that described in Example 1. Normal-heptane of the reference fuel grade was supplied to the vessl at the vessel at the rate of 1 kg./hr. through a nozzle provided at a position above the perforated plate and also an oxygen gas not containing nitrogen was supplied thereto at the rate of 0.24 Nm.³/hr. from below said perforated plate. The temperature within the fluidized bed (the average temperature of the flat portions in the temperature profile of the bed) was set at 770° C. The amount of the dry gas produced under the foregoing conditions was 0.92 Nm.³/hr., and its composition is as shown in Table 4. The amount of the liquid produced was 180 cc./hr. most of which was water and a very small amount of aldehyde and organic acids was detected.

TABLE B.—COMPOSITION OF GAS PRODUCED (MOL PERCENT)

| | |
|---|---|
| $CH_4$ | 12.1 |
| $C_2H_6$ | 1.2 |
| $C_3H_8$ | 0.1 |
| $C_4H_{10}$ | nil |
| $C_2H_4$ | 42.0 |
| $C_3H_6$ | 9.6 |
| $C_4H_8$ | 4.3 |
| $C_4H_6$ | 0.3 |
| $C_2H_2$ | 0.05 |
| $H_2$ | 8.0 |
| CO | 4.4 |
| $CO_2$ | 18.0 |

*Example 3.*—Silica-alumina carriers having grain sizes ranging from 0.3 mm. to 0.7 mm. and containing 13% by weight of alumina were impregnated with an aqueous solution of ammonium vanadate so that 13% by weight of vanadium oxide in the form of $V_2O_5$ was deposited on said carriers to prepare a catalytic composition. This composition was placed in the same vessel as the one used in Example 1 to a static layer height of 80 mm. Operation was commenced in a manner similar to that described in Example 1. A mixture which consisted of 1 kg./hr. of n-heptane of the reference fuel grade and 0.2 Nm.³/hr. of oxygen gas and which was vaporized to a homogeneous gas mixture by an evaporated and heated by a preheater was fed into the catalyst bed through the perforated plate: the amount of the dry gas formed from reaction conducted at 750° C. was 0.69 Nm.³/hr. The composition of this dry gas is as shown in Table 5. The amount of the liquid produced consisted of 135 g./hr. of aqueous phase and 230 g./hr. of hydrocarbon phase. Most of this hydrocarbon phase consisted of unreacted feed materials.

TABLE C.—COMPOSITION OF GAS PRODUCED (MOL PERCENT)

| | |
|---|---|
| $CH_4$ | 11.4 |
| $C_2H_6$ | 1.1 |
| $C_3H_8$ | 0.1 |
| $C_4H_{10}$ | nil |
| $C_2H_4$ | 45.6 |
| $C_3H_6$ | 11.5 |
| $C_4H_8$ | 5.9 |
| $C_4H_6$ | 0.1 |
| $C_2H_2$ | 0.05 |
| $H_2$ | 4.5 |
| CO | 2.2 |
| $CO_2$ | 17.5 |

*Example 4.*—On the bottom of a fluidized bed reactor, made from stainless steel, of 94 mm. in inner diameter and 800 mm. in height was placed a distributor having a hole size of 1 mm. and a ratio of opening area to the area of the distributor of 1.5%. A catalytic composition formed with 10% by weight of copper oxide as metallic copper deposited on granular α-alumina carriers having grain sizes ranging from 0.4 mm. to 0.9 mm. was placed on said distributor to a static bed height of 200 mm. This catalytic bed was heated externally to 500° C. with a heating furnace provided with electric resistance wire. Then, a mixture of 1 Nm.³/hr. of oxygen and 1 kg./hr. of steam was introduced into the reaction vessel through the distributor to fluidize the catalyst particles. Thereafter, 3.7 kg./hr. of a Middle East crude oil containing 4.8% by weight of Conradson carbon and 2.1% by weight of sulfur and mixed with 0.3 kg./hr. of steam was fed into the vessel at a level 100 mm. above the bottom of the fluidized bed, with the result that the temperature within the fluidized bed reached 860° C. Upon turning off the switch of the electric furnace, the temperature of the fluidized bed decreased, but it was held constant at 790° C. At the end of 10 hours of continuous operation under the aforesaid conditions, the amount of the dry gas produced was noted to be 3.12 Nm.³/hr. The composition of this gas is as shown in Table 6. The amount of the liquid hydrocarbons produced was 0.79 kg./hr. The sulfur content of this liquid product was 0.25% by weight. The average carbon content of the catalyst at the end of 11 hours from the time the operation was started was 0.2% by weight. Catalyst particles having hardly any adhering carbon were present in a high proportion.

TABLE D.—COMPOSITION OF GAS PRODUCED (MOL PERCENT)

| | |
|---|---|
| $CH_4$ | 19.3 |
| $C_2H_2$ | 0.3 |
| $C_2H_4$ | 27.9 |
| $C_2H_6$ | 0.9 |
| $C_3H_6$ | 7.7 |
| $C_3H_8$ | 0.1 |
| $C_4H_6$ | 0.4 |
| $C_4H_8$ | 1.9 |
| $H_2$ | 8.7 |
| CO | 5.8 |
| $CO_2$ | 27.0 |

*Example 5: Comparative.*—α-alumina particles having grain sizes ranging from 0.4 mm. to 0.9 mm. were packed in the same reaction vessel as the one used in Example 4 to a static-bed height of 200 mm. This layer was heated externally to 750° C. by an electric heater using an electrically resistance wire. Then a mixture of 1 Nm.³/hr. of oxygen and 1 kg./hr. of steam was fed into the reaction vessel through a distributor to fluidize the α-alumina particles. Thereafter, a mixture of 3.7 kg./hr. of crude oil similar to that used in Example 4 and 0.3 kg./hr. of steam was fed to the vessel at a level of 100 mm. above the bottom of the fluidized bed, with the result that the temperature of the fluidized bed was elevated to 770° C. By turning off the switch of the heater, the temperature of the fluidized bed dropped to 700° C. or lower, and therefore, the supply of the oxygen was increased to 1.15 Nm.³/hr. to maintain the temperature of the fluidized bed at 790° C. The amount of the dry gas produced was 3.62 Nm.³/hr. The composition of this gas is as shown in Table 7. The amount of the liquid hydrocarbons produced was 0.77 kg./hr. Its sulfur content was 1.4% by weight. The average carbon content of alumina at the end of 3 hours from the time the operation was started was 2.3% by weight. All of the alumina particles were found to be covered with glass-like carbonaceous substances. At the end of 8 more hours of continuous operation, the average carbon content of the alumina particles was noted to have increased to an elevated value of 3.5% by weight.

TABLE E.—COMPOSITION OF GAS PRODUCED (MOL PERCENT)

| | |
|---|---|
| $CH_4$ | 16.4 |
| $C_2H_2$ | 0.3 |
| $C_2H_4$ | 22.6 |
| $C_2H_6$ | 0.8 |
| $C_3H_6$ | 6.7 |
| $C_3H_8$ | 0.1 |
| $C_4H_6$ | 0.4 |
| $C_4H_8$ | 1.7 |
| $H_2$ | 13.9 |
| CO | 15.1 |
| $CO_2$ | 21.7 |

*Example 6.*—After calcining silica alumina carriers having grain sizes ranging from 0.3 mm. to 0.7 mm. and containing 13% by weight of alumina, they were impregnated with a solution of manganese nitrate containing 2% by weight of manganese as metallic manganese. Thereafter, the particles were immersed in a solution of copper nitrate containing 10% by weight of copper as metallic copper. Then, the resulting particles were calcined at 600° C. in air for 2 hours to prepare a catalytic composition. This composition was packed in a vessel similar in type to the one used in Example 4 to a static bed height of 200 mm. and the operation was commenced in a manner similar to that described in Example 4. A mixture of 1.06 Nm.³/hr. of oxygen and 1.0 kg./hr. of steam was fed into the reaction vessel through a distributor. On the other hand, a mixture of 3.96 l./hr. of naphtha having an initial boiling point of 41° C. and an end boiling point of 186° C. obtained from a Middle East crude oil and 0.93 kg./hr. of steam was fed into the reaction vessel at a level 50 mm. above the distributor. The yield of ethylene from the reaction conducted at 800° C. was 36.9% by weight per unit weight of naphtha and similarly the yield of propylene was 10.3% by weight. The carbon monoxide to carbon dioxide mole ratio in the product gas was 0.31.

A similar operation was conducted with a fluidized bed consisting of silica-alumina particles containing no copper or manganese. The amount of oxygen required to keep the reaction temperature at 800° C. was as large as 1.44 Nm.³/hr. The yields of ethylene and propylene were 30.0% and 6.5% by weight, respectively, which were smaller than the values obtained from the operation using the silica-alumina particles carrying thereon a catalytic component. The yield of carbon monoxide increased in contrast to the yields of ethylene and propylene, showing the carbon monoxide to carbon dioxide in the product to be 0.94 in molar ratio.

The following is a tabulation of the data previously given in this specification.

| Catalyst | Hydrocarbon | Reaction temp., °C. | Composition of product gas | | | | | | | | | | | |
|---|---|---|---|---|---|---|---|---|---|---|---|---|---|---|
| | | | $H_2$ | $N_2$ | $O_2$ | CO | $CO_2$ | $CH_4$ | $C_2H_4$ | $C_2H_6$ | $C_3H_6$ | $C_3H_8$ | $C_4H_{10}$ | $C_4H_6$ | $C_4H_8$ |
| Ex. 1 ... 10 percent Cu on α alumina | Ethane | 840 | 23.3 | 1.5 | 0.0 | 0.7 | 4.5 | 2.2 | 64.6 | 2.2 | 1.0 | | | 0.3 | 4.3 |
| Ex. 2 ... 12 percent N₂O₃ plus 5 percent Cu on silica alumina | n-Heptane | 770 | 8.0 | | | 4.4 | 18.0 | 12.1 | 42.0 | 1.2 | 9.6 | 0.05 | Nil | 0.1 | 5.9 |
| Ex. 3 ... 13 percent V₂O₃ on alumina | n-Heptane | 750 | 4.5 | | | 2.2 | 17.5 | 11.4 | 45.6 | 1.1 | 11.5 | 0.05 | Nil | | 1.9 |
| Ex. 4 ... 10 percent Cu on α alumina | Crude oil | 790 | 8.7 | | | 5.8 | 27.0 | 19.3 | 27.9 | 0.9 | 7.7 | 0.3 | | 0.4 | 1.3 |
| Ex. 5 (comparative) ... α alumina | Crude oil | 790 | 13.9 | | | 15.1 | 21.7 | 16.7 | 22.6 | 0.8 | 6.7 | 0.3 | | 0.4 | 1.7 |
| Table 2, 3 volumes ethane; 1 volume oxygen | | | 27.0 | 1.0 | 0.6 | 11.0 | 1.4 | 8.0 | 31.0 | 17.0 | 2.5 | 0.5 | | | |

What is claimed is:

1. In a process for producing lower mono-olefins consisting predominantly of ethylene by the fluid-bed oxidative catalytic cracking of ethane and other hydrocarbons having boiling points higher than that of ethane by passing streams of the hydrocarbon and an oxygen-containing gas through a fluidized bed of particulate catalyst solids at a temperature of from 650° C. to 900° C., the improvement which comprises passing hydrocarbon in the vapor phase through the fluidized catalyst bed and simultaneously passing a preheated oxygen-containing gas through the catalyst bed with the amount of oxygen supplied being in the range of 0.03 to 1.1 parts by weight based on the weight of the hydrocarbon, the fluidized catalyst bed consisting of at least 80% by weight of inert heat-resistant particles of a particle size of from about $20\mu$ to 5 mm. and the balance consisting essentially of from 0.5% to 20% by weight, calculated as the metal, of a catalyst component selected from one or more members of the group consisting of copper, manganese, chromium, vanadium, zinc, silver and cadmium deposited on said inert particles, and maintaining a contact between said streams and said bed for a time period in the range of 0.02 second to 5 seconds so that the amount of oxygen converted to carbon monoxide is not greater than about 12% whereby to obtain a gaseous product containing a low amount of hydrogen, a high ratio of carbon dioxide to carbon monoxide and a large amount of mono-olefins having from 2 to 4 carbon atoms and comprised predominantly of ethylene.

2. A process according to claim 1, wherein said hydrocarbon feed stock is a crude petroleum oil.

3. A process according to claim 1, wherein said oxygen-containing gas has an oxygen content of 80% by volume or higher.

4. A process according to claim 1, wherein said fluidized catalyst bed consists solely of said particles on which is deposited said catalyst component.

5. A process according to claim 1, wherein said fluidized catalyst bed consists of particles on which is deposited said catalyst component and particles of a solid fire-resistant inert material free of catalyst component, said latter particles being present in an amount not in excess of 10 times the amount of said first-named particles.

6. A process according to claim 1, wherein said catalyst component is a member selected from the group consisting of copper, vanadium pentoxide, manganese and mixtures thereof said copper component being selected from the group consisting of copper metal and copper compounds.

7. A process according to claim 1, wherein the fluidization of said fluidized bed is effected by a gas selected from the group consisting of hydrogen, methane, steam, and vapors of petroleum oil fractions.

8. A process according to claim 1, in which the catalyst component is present in an amount of at least about 7.5% by weight of the weight of the catalyst bed.

9. A process according to claim 1, in which the catalyst bed consists essentially of about 10% by weight of copper deposited on alpha alumina.

10. A process according to claim 1, in which the catalyst bed consists essentially of about 12% by weight vanadium pentoxide and about 5% by weight of copper deposited on silica alumina.

11. A process according to claim 1, in which the catalyst bed consists essentially of about 13% by weight vanadium pentoxide deposited on silica alumina.

12. A process according to claim 1, in which the catalyst bed consists essentially of about 10% by weight of copper and 2% by weight of manganese deposited on silica alumina.

References Cited
UNITED STATES PATENTS

| | | | |
|---|---|---|---|
| 1,972,898 | 9/1934 | Odell | 260—683 X |
| 2,326,258 | 8/1943 | Schmidt et al. | 260—680 |
| 2,752,407 | 6/1956 | Cahn | 260—683 |
| 2,824,148 | 2/1958 | Keulemans et al. | 260—683 |
| 3,161,696 | 12/1964 | Eder et al. | 260—683 |
| 3,175,019 | 3/1965 | Parker | 260—683 |
| 3,221,076 | 10/1965 | Frey et al. | 260—683 |
| 3,308,191 | 3/1967 | Bajars | 260—680 |
| 3,334,152 | 8/1967 | Bajars et al. | 260—680 |
| 3,342,890 | 9/1967 | Croce et al. | 260—680 |
| 3,375,291 | 3/1968 | Callahan et al. | 260—680 |

DELBERT E. GANTZ, Primary Examiner

G. E. SCHMITKONS, Assistant Examiner

U.S. Cl. X.R.

208—208, 213, 243; 260—668, 673.5, 677, 683